US007361838B2

(12) United States Patent
Kuo

(10) Patent No.: US 7,361,838 B2
(45) Date of Patent: Apr. 22, 2008

(54) CABLE WITH STRAIN RELIEF

(75) Inventor: Peter Kuo, Tu-cheng (TW)

(73) Assignee: Hon Hai Precision Ind. Co., Ltd, Taipei Hsien (TW)

( * ) Notice: Subject to any disclaimer, the term of this patent is extended or adjusted under 35 U.S.C. 154(b) by 0 days.

(21) Appl. No.: 11/591,364

(22) Filed: Oct. 31, 2006

(65) Prior Publication Data

US 2007/0099485 A1 May 3, 2007

(30) Foreign Application Priority Data

Oct. 31, 2005 (CN) ........................ 2005 1 0095194

(51) Int. Cl.
*H02G 15/02* (2006.01)

(52) U.S. Cl. ................................ 174/74 R; 174/77 R

(58) Field of Classification Search .............. 174/65 R, 174/65 G, 153 G, 135, 151, 152 G
See application file for complete search history.

(56) References Cited

U.S. PATENT DOCUMENTS 3,051,774 A * 8/1962 Schelke ...................... 174/135
4,461,529 A * 7/1984 Fariss ......................... 439/604
4,912,287 A * 3/1990 Ono et al. .............. 174/153 G
5,014,938 A * 5/1991 Potzas ......................... 248/56
5,058,172 A * 10/1991 Ross et al. .................. 381/122
5,329,603 A * 7/1994 Watanabe et al. ............. 385/86
5,571,145 A * 11/1996 Drebin ........................ 607/37
5,703,328 A * 12/1997 Johannsen .................. 174/653
5,739,472 A * 4/1998 Buck et al. ................. 174/107
5,833,495 A * 11/1998 Ito ............................ 439/610
5,981,877 A * 11/1999 Sakata et al. ........... 174/153 G
6,389,642 B1 * 5/2002 Coombs ........................ 16/2.5
6,482,017 B1 * 11/2002 Van Doorn .................. 439/89
6,672,774 B2 * 1/2004 Theuerkorn et al. .......... 385/86
6,805,826 B2 * 10/2004 Coombs ................ 264/272.15
2001/0049519 A1 * 12/2001 Holman et al. ............. 604/534
2003/0220628 A1 * 11/2003 Klisch et al. ............... 604/524

* cited by examiner

*Primary Examiner*—William H. Mayo, III
(74) *Attorney, Agent, or Firm*—Wei Te Chung

(57) ABSTRACT

A cable (100) has a wire conductor (1) with an insulative layer enclosing the wire conductor, and a strain relief (2). The strain relief has an internal strain relief (22) enclosing the insulative layer of the wire conductor, and an external strain relief (21) enclosing the internal strain relief. The internal strain relief being made of a low-intensity material, and the external strain relief being made of a high-intensity material.

13 Claims, 5 Drawing Sheets

CABLE WITH STRAIN RELIEF

BACKGROUND OF THE INVENTION

1. Field of the Invention

The present invention relates to a cable, and particularly to a cable having a strain relief.

2. Description of Prior Arts

As we all know, a strain relief is required on a consumer electronic manufacture with a cable. For attracting more consumers, the outward aspect is very important. Accordingly, as a part of the consumer electronic manufacture, the outward aspect is also important to the strain relief. So, a low-intensity material, such as smokeless no halogen, is always used as the material of the strain relief. However, the low-intensity material cause the retention of the strain relief down is a manifest problem we need to face.

Obviously, it is desirable to have a cable with an improved strain relief.

SUMMARY OF THE INVENTION

An object of the present invention is to provide a cable having a strain relief with a good outward aspect and strong relief.

To achieve the above object, a cable comprises a wire conductor with an insulative layer enclosing the wire conductor, and a strain relief. The strain relief comprises an internal strain relief enclosing the insulative layer of the wire conductor, and an external strain relief enclosing the internal strain relief. The internal strain relief being made of a high-intensity material, and the external strain relief being made of a low-intensity material.

Other objects, advantages and novel features of the invention will become more apparent from the following detailed description of the present embodiment when taken in conjunction with the accompanying drawings.

DETAILED DESCRIPTION OF THE PREFERRED EMBODIMENT

Figure 1:
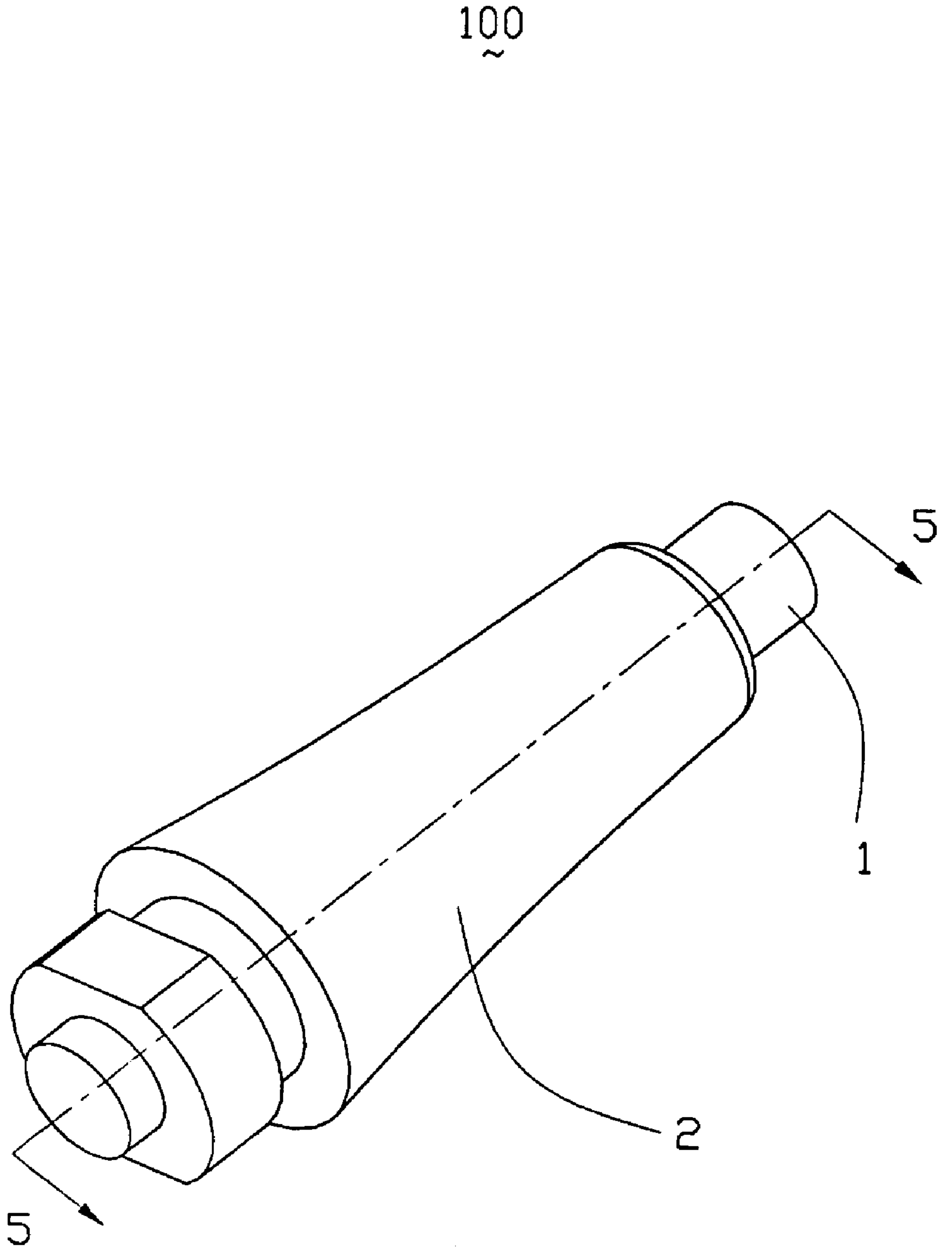
FIG. 1 is an assembled, perspective view of a cable in accordance with the present invention.
Figure 2:
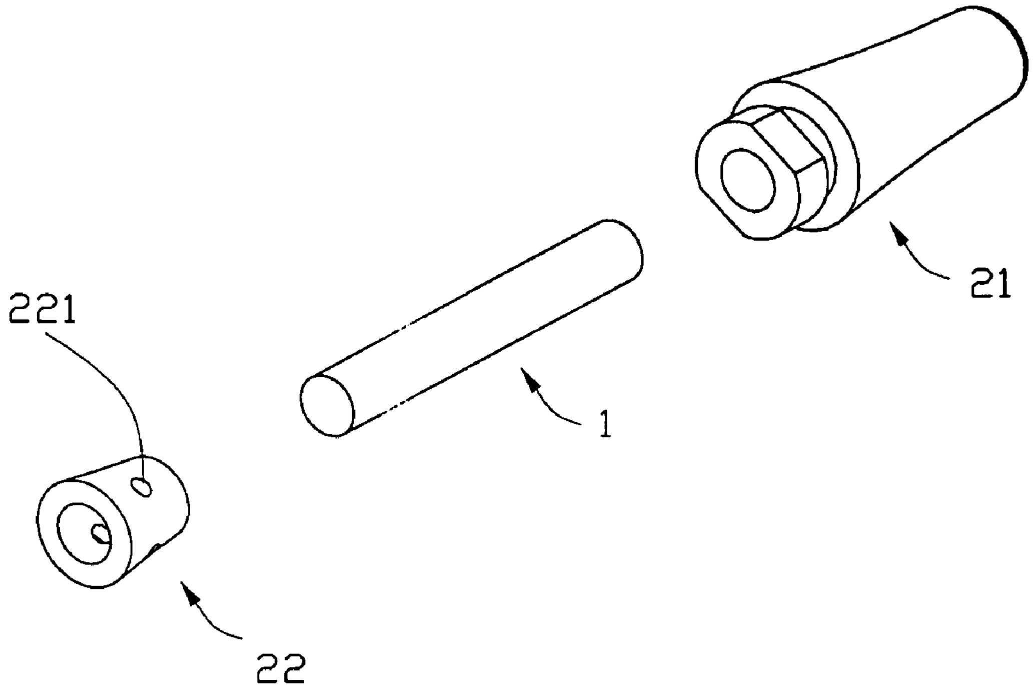
FIG. 2 is an exploded, perspective view of the cable.
Figure 3:
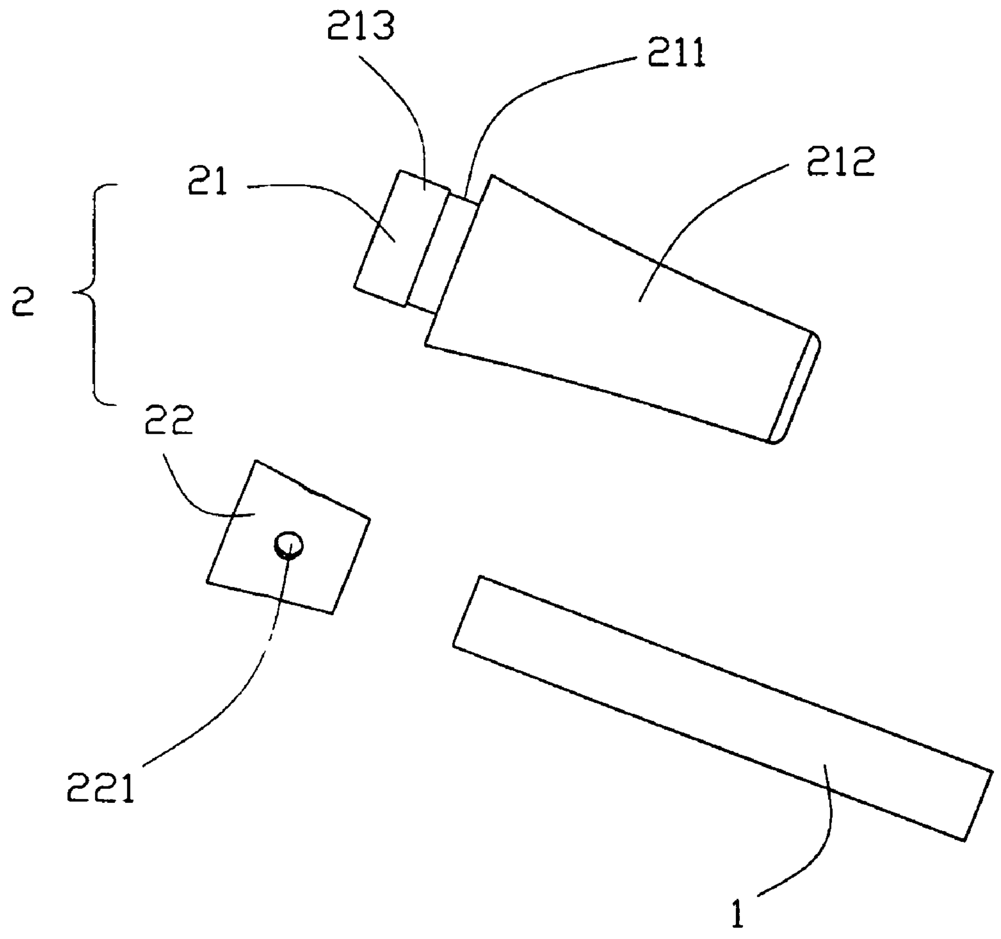
FIG. 3 is a view similar to FIG. 1, but taken from a different aspect.

Referring to FIGS. 1 to 3, a cable 100 in accordance with the present invention comprises a conductive wire 1 and a strain relief 2. The strain relief 2 comprises an external strain relief 21 and an internal strain relief 22.

The external strain relief 21 is made of low-intensity material, such as smokeless no halogen, and comprises a main portion 212, a retaining slot 211 and a retaining portion 213. During the cable 100 connects to the electrical connector (not shown), the conductive wire electrically connects with corresponding conductive member (not shown) of the electrical connector, and the retaining slot 211 and the retaining portion 213, respectively, engage with corresponding retaining members (not shown) of the electrical connector.

Figure 4:
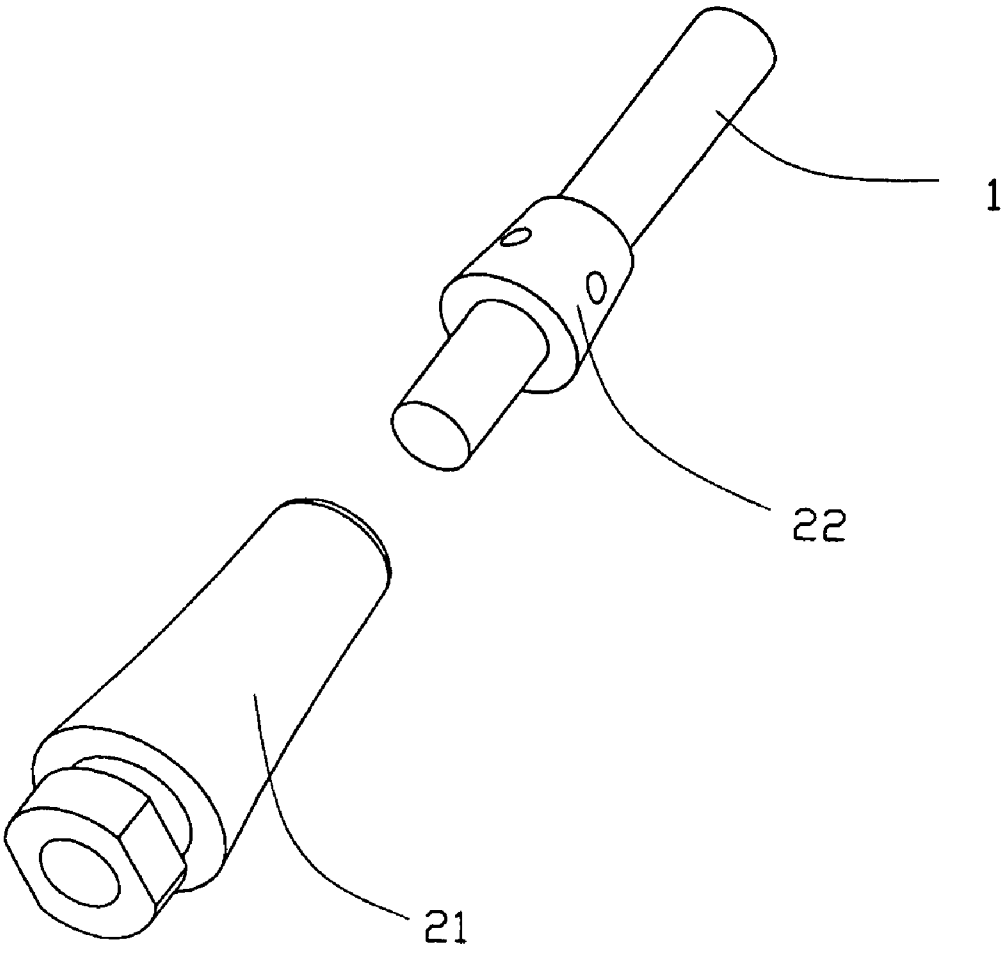
FIG. 4 is a partially exploded, perspective view of the cable.
Figure 5:
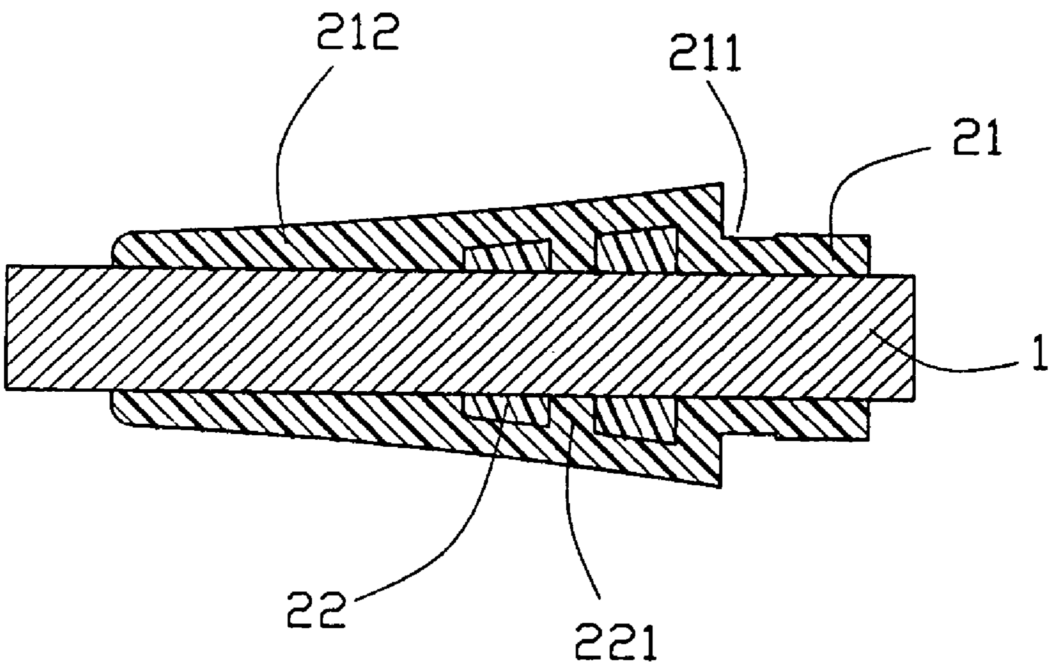
FIG. 5 is a cross-section view along the line 5-5 of the FIG. 1.

Referring to FIGS. 4 and 5, the internal strain relief 22 made of high-intensity material, such as smokeless no halogen, is located between the external strain relief 21 and the conductive wire 1. The internal strain relief 22 is over-molded on an insulative layer (not labeled) enclosing the conductive wire 1, and comprises a plurality of through holes 221. The external strain relief 21 is over-molded on the internal strain relief 22. An inside surface of the external strain relief 21 engages with the insulative layer and an outer surface of the internal strain relief 22, and resists with the through hole 221 of the internal relief 21. During molding, the thawing material of the external strain relief 21 flows into the through holes 221 of the internal strain relief 22 to increase the retention between them.

Referring to FIG 5, the size of the external strain relief 21 is bigger than that of the internal strain relief 22, accordingly, the external strain relief 21 completely encloses and is partially fused with the internal strain relief 22. The external relief 21 partially connects with the insulative layer. Because the insulative layer and the external strain relief 21 are made of same material, such as smokeless no halogen, the external strain relief 21 has a confirm combine with the insulative layer. The fluidity and the pliability of the smokeless no halogen are excellence. Accordingly, the external strain relief 21 is avoided to have a transfiguration cause of the pressure during the molding. The internal strain relief 22 is made of a material with high-intensity material and has a strong retention. Obviously, the strain relief made as above mentioned has a good outward aspect and a strange retention.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

I claim:

1. A cable, comprising:

a wire conductor with an insulative layer enclosing the wire conductor;

a strain relief comprising an internal strain relief enclosing the insulative layer of the wire conductor, and an external strain relief completely enclosing and partially fused with the internal strain relief;

the internal strain relief being made of a high-intensity plastic material, and the external strain relief being made of a low-intensity plastic material.

2. The cable as described in claim 1, wherein internal strain relief defines a plurality of holes adaptor for increase the retention between the internal strain relief and the external relief.

3. The cable as described in claim 2, wherein the holes are through holes, the external strain relief resisting with the insulative layer through said through holes.

4. The cable as described in claim 1, wherein the low-intensity material is smokeless no halogen.

5. The cable as described in claim 1, wherein the high-intensity material is smoke no halogen.

6. The cable as described in claim 1, wherein the material of the insulative layer and the external strain relief is the same.

7. A cable, comprising:

a wire conductor with an insulative layer enclosing the wire conductor;

a strain relief comprising an internal strain relief enclosing the insulative layer of the wire conductor, and an external strain relief completely enclosing the internal strain relief; wherein the internal strain relief defines some through hole through hole through which the external strain relief directly radially contacts the insulative layer so as to mingle the internal strain relief and the external strain relief together around said through hole.

8. The cable as claimed in claim 7, wherein the internal strain relief is configured to be prevented from being engaged with any other exterior parts except the exterior strain relief and the insulative layer.

9. The cable as claimed in claim 7, wherein the internal strain relief being made or a high-intensity material, and the external strain relief being made of a low-intensity material.

10. The cable as claimed in claim 7, wherein said internal strain relief directly intimately contacts the insulative layer.

11. A method of make a cable, comprising:

providing a wire conductor with an insulative layer enclosing the wire conductor; and providing a strain relief comprising an internal strain relief over-molded the insulative layer of the wire conductor, and an external strain relief completely over-molded the internal relief; wherein the internal strain relief being made of a high-intensity material, and the external strain relief being made of a low-intensity material.

12. The method as claimed in claim 11, wherein the internal strain relief is configured to be preventing from being engaged with any other exterior parts except the exterior strain relief and the insulative layer.

13. The method as claimed in claim 11, wherein said internal strain relief directly intimately contacts the insulative layer.

* * * * *